(12) United States Patent
Hendrix et al.

(10) Patent No.: US 6,632,309 B1
(45) Date of Patent: Oct. 14, 2003

(54) STRUCTURAL REINFORCEMENT MEMBER AND METHOD OF UTILIZING THE SAME TO REINFORCE A PRODUCT

(75) Inventors: James E. Hendrix, Pacolet, SC (US); Gordon L. Brown, Jr., Anderson, SC (US); Mansfield H. Creech, Jr., Anderson, SC (US)

(73) Assignee: Hexcel CS Corporation, Stamford, CT (US)

( * ) Notice: Subject to any disclaimer, the term of this patent is extended or adjusted under 35 U.S.C. 154(b) by 94 days.

(21) Appl. No.: 09/636,140

(22) Filed: Aug. 10, 2000

Related U.S. Application Data (62) Division of application No. 09/013,369, filed on Jan. 26, 1998, now Pat. No. 6,123,879, which is a division of application No. 08/556,030, filed on Nov. 19, 1995, now Pat. No. 5,836,715.

(51) Int. Cl.$^7$ ................................................ B32B 31/00
(52) U.S. Cl. ........................ 156/148; 156/177; 156/178; 156/179; 156/205
(58) Field of Search ................................. 156/177, 178, 156/179, 433, 441, 205, 148

(56) References Cited

U.S. PATENT DOCUMENTS

| | | | |
|---|---|---|---|
| 2,634,603 A | | 4/1953 | Byars et al. |
| 3,041,230 A | * | 6/1962 | Diehl ........................ 156/161 |
| 3,356,555 A | * | 12/1967 | Jackson ....................... 156/205 |
| 3,397,626 A | | 8/1968 | Kornick et al. |
| 3,649,411 A | * | 3/1972 | Bolles ......................... 156/177 |
| 3,673,058 A | * | 6/1972 | Jackson et al. .............. 428/107 |
| 3,844,822 A | | 10/1974 | Boss et al. |
| 4,088,708 A | | 5/1978 | Riew |
| 4,168,924 A | | 9/1979 | Draper et al. |
| 4,242,779 A | | 1/1981 | Curinier et al. |
| 4,379,798 A | | 4/1983 | Palmer et al. |

(List continued on next page.)

FOREIGN PATENT DOCUMENTS

| | | |
|---|---|---|
| CA | 1 240 873 | 8/1988 |
| DE | 1 479 974 | 7/1969 |
| DE | 23 57 557 | 4/1975 |
| DE | 31 20 661 | 12/1982 |
| EP | 0 241 803 | 10/1987 |
| EP | 0 318 707 | 10/1988 |
| EP | 0 297 006 | 12/1988 |
| EP | 0 318 707 | 6/1989 |
| EP | 0 387 968 | 9/1990 |
| EP | 0 637 658 | 2/1995 |
| GB | 2 048 971 | 12/1980 |
| GB | 2 173 152 A | 10/1986 |
| GB | 2 191 115 A | 12/1987 |
| JP | 29542/1979 | 2/1979 |
| JP | 66362/1988 | 3/1988 |
| JP | 6-218855 A * | 8/1994 |
| JP | 6-218856 A * | 8/1994 |

OTHER PUBLICATIONS

Lubin, George, Handbook of Composites, 1982, pp. 756, 771.*

Primary Examiner—Jeff H. Aftergut
(74) Attorney, Agent, or Firm—Alston & Bird LLP (57) ABSTRACT

A structural member for reinforcement of asphalt and concrete roadways and other products, and which comprises a gridwork of warp strands and weft strands which are disposed at right angles to each other and so as to define an open structure. In one embodiment, the gridwork is impregnated with a thermosettable B-stage resin so as to interlock the strands at their crossover points and maintain the gridwork in a semi-flexible state, and after being applied to the product to be reinforced, the resin is heated to convert the same into a fully cured composite to thereby rigidize the gridwork and reinforce the product. In cases where the product to be reinforced is heated, such as asphalt paving, the heat of the product provides the heat necessary to fully cure the resin in situ. In another embodiment, the resin is fully cured to rigidize the gridwork prior to its being applied to the structure to be reinforced. A method of producing the resin impregnated gridwork is also disclosed.

7 Claims, 4 Drawing Sheets

U.S. PATENT DOCUMENTS

| | | |
|---|---|---|
| 4,413,391 A | 11/1983 | Renjilian et al. |
| 4,510,198 A | 4/1985 | Rheaume |
| 4,617,219 A | 10/1986 | Schupack |
| 4,680,213 A | 7/1987 | Fourezon |
| 4,699,542 A | 10/1987 | Shoesmith |
| 4,706,430 A | 11/1987 | Sugita et al. |
| 4,725,485 A | 2/1988 | Hirokawa |
| 4,819,395 A | 4/1989 | Sugita et al. |
| 4,902,548 A | 2/1990 | Cholat-Serpoud et al. |
| 4,910,076 A | 3/1990 | Ando et al. |
| 4,957,390 A * | 9/1990 | Shoesmith .................. 404/70 |
| 4,966,801 A | 10/1990 | Becker et al. |
| 4,996,816 A | 3/1991 | Wiebe |
| 5,025,605 A | 6/1991 | Sekijima et al. |
| 5,110,627 A | 5/1992 | Shoesmith et al. |
| 5,158,821 A | 10/1992 | Gebauer et al. |
| 5,246,306 A | 9/1993 | Shoesmith et al. |
| 5,273,804 A | 12/1993 | Brian et al. |
| 5,314,556 A * | 5/1994 | Woiceshyn .................. 156/177 |
| 5,372,868 A | 12/1994 | Prewo et al. |
| 5,439,726 A * | 8/1995 | Woiceshyn .................. 442/36 |
| 5,595,795 A | 1/1997 | Alfred |
| 5,651,848 A | 7/1997 | Cohee et al. |
| 5,836,715 A | 11/1998 | Hendrix et al. |
| 5,888,608 A | 3/1999 | Tsai |
| 6,123,879 A | 9/2000 | Hendrix et al. |
| 6,454,889 B1 | 9/2002 | Hendrix et al. |

* cited by examiner

STRUCTURAL REINFORCEMENT MEMBER AND METHOD OF UTILIZING THE SAME TO REINFORCE A PRODUCT

CROSS-REFERENCE TO RELATED APPLICATION

This application is a division of application Ser. No. 09/013,369, filed Jan. 26, 1998, now U.S. Pat. No. 6,123,879; which is a division of application Ser. No. 08/556,030, filed Nov. 19, 1995, and now U.S. Pat. No. 5,836,715, issued Nov. 17, 1998.

FIELD OF THE INVENTION

The present invention generally relates to structural members adapted to reinforce a product. The present invention also relates to methods of utilizing the structural member to form reinforced products.

BACKGROUND OF THE INVENTION

Traditional structures and products experience deterioration or failures of various kinds which create a need for reinforcement. For example, roadways consisting of asphaltic concrete materials experience deterioration and failure over time in the form of reflective cracking, rutting, rolling up at traffic lights and "potholes." This deterioration and failure of asphaltic concrete roadways require costly, frequent, and time consuming repairs. Another family of products, concrete structures, such as columns, flat slabs, or constant cross-section shapes, deteriorate over time or as a result of seismic activity or need reinforcement for improved properties such as tensile strength. Various approaches have been investigated to address these problems by reinforcing the initial or existing products.

In regards to roadways, asphalt roadways are widely used, yet experience frequent and costly types of deterioration. Asphalt paving consists of an asphalt compound combined with "rock aggregate." The aggregate adds to the compression strength of the asphalt with the asphalt compound acting as a matrix to bind the road together. Asphalt roads deteriorate more quickly than concrete roads, and typical forms of deterioration are "reflective cracking", curling of the asphalt at places like stoplights, grooving of the asphalt due to repeated vehicular traffic following the same path down the roadway and other cracking of the asphalt surface. "Reflective cracking" is a major problem in asphalt overlays of existing concrete roads or other road foundations. Reflective cracking occurs where cracks in the existing concrete or asphaltic road or foundation propagate from the existing road up through the new asphalt overlay. This requires costly repairs to otherwise new roads and attacks the strength of the new overlay.

A variety of materials have been tried in the past to attempt to provide reinforcement or stabilization for asphalt roadways. Several products currently seek to address the reflective cracking problem. One product is a non-woven overlay fabric or mat between a concrete road and an asphalt overlay called Petromat® from Amoco Fabrics and Fibers. Petromat® uses a random orientation of polypropylene fibers in a fabric mat that is laid down as a barrier between a road or road foundation and an asphalt overlay. The polypropylene does not have the modulus to resist expansion of concrete road in attempting to address the problem of reflective cracking. Also, the mat is of tight construction and does not allow asphalt or concrete to pass through the structure, instead acting as a barrier between the layers. The mat is therefore not incorporated as a reinforcement structure throughout the new overlay. Instead, the mat acts only as a barrier which can wrinkle or fold in application. Further, a leveling or filling of cracks is necessary before using the Petromat®.

Others have tried to use mesh structures of plastic materials and woven fabrics to reinforce roadways. One product, Glasgrid® is a woven (leno) glass fiber fabric grid, coated with asphalt black coating with one side having self-adhesive properties. Another product, Raupave® is a geo-grid composed of high-tenacity fiberglass yarn which is woven into a uniform, leno grid configuration. Another product, Polyfelt PGM-G® consists of fiberglass rovings laid in a grid pattern onto a non-woven felt with the felt meant to act as a water barrier to attempt to retard reflective cracking.

Attempts have been made to use other tightly constructed structures which reinforce the roadway, but do not allow the passage of asphaltic concrete road materials through the reinforcing structure in the normal paving process. Difficulties have arisen from using such tightly constructed reinforcement members in road construction. These tightly constructed reinforcement members create a barrier between the new road overlay and the old road or foundation restricting the passage through or incorporation of asphaltic concrete materials into the reinforcement member. This reduces the reinforcement benefits of the reinforcing member and enables slippage or movement in the normal paving process.

Another family of products and structures which require reinforcement are concrete structures and other masonry or cementitious materials. These concrete materials have low tensile strength yet have good compressive strength. When using concrete as a structural member, for example, in a bridge, building or the like, reinforcement is often used to impart the necessary tensile strength. In new and existing concrete structures, such as precast driveways, slabs, sidewalks, pipe etc, reinforcement has been undertaken with a variety of steel shapes such as open steel meshes, steel rebar, and steel grids. Steel grids have been used in reinforcing concrete structures such as decking for drawbridges. These steel grids are a closed cell structure, and each section of steel grid contains and confines a rectangular or square column of concrete. These types of grids are inherently very inefficient in their use of the reinforcing material.

Steel and other metals used as a reinforcing agent are subject to corrosion. The products of corrosion result in an expansion of the column of the steel which causes a "spalling" effect which can cause a breakup and deterioration of the concrete structure. This breaking and crumbling of concrete structures are severe in areas of high humidity and areas where salt is used frequently on roads, driveways and sidewalks to melt ice or snow. Bridges over waterways in areas such as the Florida coast or Florida Keys are exposed to ocean air which causes deterioration and a short lifespan requiring constant rebuilding of these bridges. Concrete structures in the Middle East use concrete made with the local acidic sand which also causes corrosion of steel reinforcements.

To replace traditional steel in reinforcing concrete, many types of plastics have been considered. One attempted replacement for steel in reinforcement uses steel rebars coated with epoxy resin. Complete coating coverage of the steel with epoxy, however, is difficult. Also, due to the harsh handling conditions in the field, the surface of the epoxy coated steel rebars frequently will be nicked. This nicking results in the promotion of localized, aggressive corrosion of the steel and results in the same problems as described above.

Fiberglass composite rebars have been used in reinforcing concrete structures such as the walls and floors of x-ray rooms in hospitals where metallic forms of reinforcement are not permitted. The method of use is similar to steel rebars. The fiberglass composite rebars have longitudinal discrete forms which are configured into matrixes using manual labor. Concrete is then poured onto this matrix structure arrangement.

Fiberglass composite rebars are similar to steel rebars in that the surface is deformed. Fiberglass gratings which are similar to steel walkway gratings also have been used as reinforcements in Concretes, but their construction, which forms solid walls, does not allow the free movement of matrix material. This is due to the fact that the "Z" axis or vertical axis reinforcements form solid walls.

In dealing with reinforcing concrete support columns or structures, wraps have been applied around the columns to act like girdles and prevent the concrete from expanding and crumbling. Concrete is not a ductile material, thus, this type of reinforcing is for only the external portion of the column. One type of wrap consists of wrapping a fabric impregnated with a liquid thermosetting resin around the columns. The typical construction of these wraps has glass fiber in the hoop direction of the column and glass and Kevlar fibers in the column length direction. Another approach uses carbon fiber uni-directional (hoop direction) impregnated strips or strands which are designed to be wound under tension around deteriorated columns. The resulting composite is cured in place using an external heat source. In these approaches the materials used in the reinforcing wraps are essentially applied to the concrete column in an uncured state, although a prepreg substrate may be employed which is in a "semi-cured" state, i.e. cured to the B-stage. When using a woven fabric, "kinking" can take place when using either carbon or glass fibers, because the weaving process induces inherent "kinks" in either a woven wet laminate or woven prepreg, which results in a less than perfectly straight fiber being wrapped around the column.

Another approach to reinforcing concrete structures and columns is to weld steel plates around the concrete columns to give support to the concrete wall. Such steel plates are also subject to corrosion and loosening resulting from deterioration of the column being supported. This approach is only an external reinforcement and lacks an acceptable aesthetic appearance which makes it undesirable.

An approach to reinforcing concrete mixes has been using short (¼ to 1") steel, nylon or polypropylene fibers. Bare "E-type" glass fibers are generally not used due to the susceptibility of glass fibers to alkaline attack in Portland cement.

Thus, there is a need for improved structural members adapted to reinforce a variety of products. For example, there is a need for an improved structural reinforcement member for use in asphaltic concrete roadways. Additionally, there continues to be a need for a structural reinforcement member for concrete structures which accomplishes the reinforcement or increases material properties of the concrete structure without being subject to corrosion or attack. There also remains a need for methods to reinforce products using these structural members.

It is an object of the invention to overcome the deficiencies of the prior art as noted. A more particular object of this invention is to provide a structural member adapted to effectively reinforce a variety of different products. A further object of the invention is to provide methods for utilizing the structural member adapted to reinforce a product, and for efficiently producing the structural member.

SUMMARY OF THE INVENTION

The above and other objects and advantages of the present invention are achieved by the provision of a structural member adapted to reinforce a product and methods for utilizing the same as described herein. One embodiment of the invention comprises a gridwork comprising a set of warp strands and a set of weft strands disposed at substantially right angles to each other, with each of the strands comprising at least one continuous filament, and with at least some of the strands of each set being spaced apart so as to define an open structure, and with the gridwork being impregnated substantially throughout with a thermosettable B-stage resin so as to interlock the strands at their crossover points and maintain the gridwork in a semi-flexible state which permits the gridwork to conform to the shape of the product to be reinforced. Thus with the gridwork in a semi-flexible state, the member can be conformed to the shape of the product to be reinforced. The resin is curable in situ in the product to form a rigid composite by heating to a predetermined temperature. The product is thereby reinforced with the cured member within it.

Preferably, the sets of strands are non-interlaced, and in one embodiment, the set of warp strands and the set of weft strands are substantially linear, so that the gridwork is generally flat. In another embodiment, the set of warp strands is corrugated into alternating ridges and grooves, and wherein the set of weft strands is substantially linear, so that the gridwork has a three-dimensional configuration.

Still another embodiment of the invention comprises a structural member of the structure defined above, but which is instead impregnated substantially throughout with a fully cured thermoset resin so as to interlock the strands at their crossover points and maintain the gridwork in a relatively rigid state. This embodiment is particularly suitable for use in reinforcing products made of Portland cement concrete.

Another embodiment of the invention comprises a three-dimensional structural reinforcement member comprising a three-dimensional open mesh gridwork as described used in conjunction with a generally flat open gridwork as described with the generally flat gridwork being positioned to be coextensive with one of the planes of the three-dimensional gridwork. One particular embodiment of the invention comprises this three-dimensional structural reinforcement member impregnated substantially throughout with a thermosettable B-state resin as described previously so as to interlock the strands at their crossover points and to retain the gridworks in a semi-rigid three-dimensional configuration. Another particular embodiment of the invention comprises this three-dimensional structural reinforcement member impregnated with a fully cured thermoset resin so as to interlock the strands at their crossover points and maintain the gridwork in a relatively rigid state.

Another embodiment of the invention comprises a method of structurally reinforcing a product comprising the steps of providing an open mesh gridwork as described above being impregnated substantially throughout with a thermosettable B-stage resin so as to interlock the strands at their crossover points and maintain the gridwork in a semi-flexible state which permits the gridwork to conform to the shape of the product to be reinforced; applying the gridwork to the product; and then applying heat to the gridwork so as to cure the resin and convert the same into a cured composite to thereby rigidize the gridwork and reinforce the product.

A further embodiment of the invention comprises a method of fabricating a reinforced roadway composed of an asphaltic concrete material comprising the steps of preparing a foundation for the roadway; providing an open mesh gridwork as described above impregnated substantially throughout with a thermosettable B-stage resin so as to interlock the strands at their crossover points and maintain the gridwork in a semi-flexible state. Asphaltic concrete, which is heated to a predetermined temperature is then applied upon the foundation, with the gridwork embedded therein, and such that the heat of the asphaltic concrete acts to cure the resin in situ and convert the same into a cured composite to thereby rigidize the gridwork and reinforce the asphaltic concrete.

Still another feature of the present invention involves an efficient method of producing a structural member of the described type, and which includes the steps of advancing the gridwork along a path of travel while (1) immersing the advancing gridwork in a liquid resin which is thermosettable and capable of being heated to cure to the B-stage, (2) guiding the resin coated advancing gridwork through a nip so as to squeeze off excess resin, cause the resin to penetrate into the strands, and firmly press the crossover points of the sets of strands together, and then (3) heating the advancing gridwork to an extent sufficient to cause the resin to cure to the B-stage without fully thermosetting.

The resulting gridwork with the B-stage resin may then be formed into a supply package, such as a supply roll, so that it may be conveniently transported to the job site. At the job site, the gridwork is withdrawn from the supply package, conformingly applied to the product, and then heated so as to cure the resin and convert the same into a cured composite and thereby rigidize the gridwork and reinforce the product. Where the gridwork is used to reinforce asphaltic concrete which is applied to the roadway foundation in a heated condition, the heat of the asphaltic concrete acts to cure the resin, as described above.

BRIEF DESCRIPTION OF THE DRAWINGS

FIGS. 1 and 1A are a schematic environmental view of method of fabricating an asphalt or reinforced roadway composed of asphaltic concrete material using an open mesh gridwork which embodies the present invention.

DETAILED DESCRIPTION OF THE INVENTION

The present invention will now be described in detail hereinafter by reference to the accompanying drawings. The invention is not intended to be limited to the embodiments described; rather, this detailed description is included to enable any person skilled in the art to make and use the invention.

Figure 2:
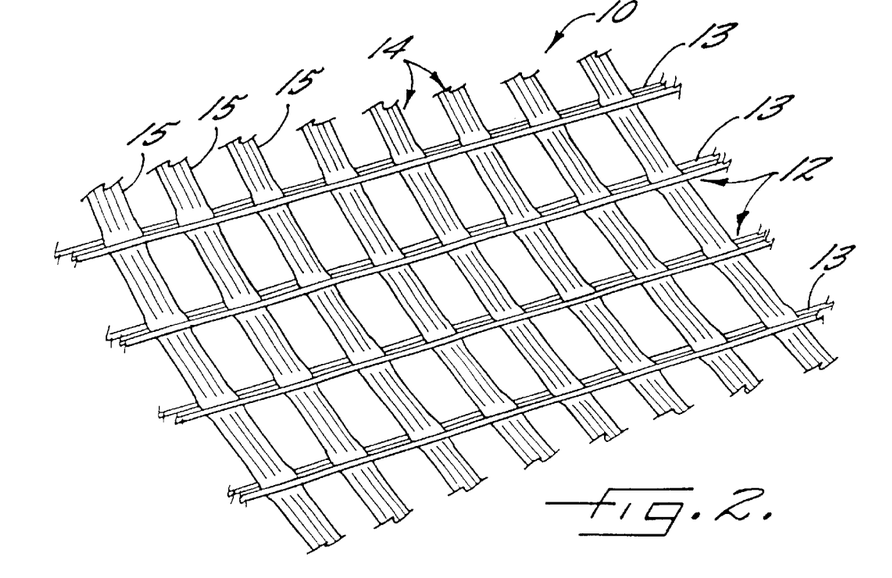
FIG. 2 is a perspective view of a structural reinforcement member comprising one embodiment of the present invention.
Figure 2A:
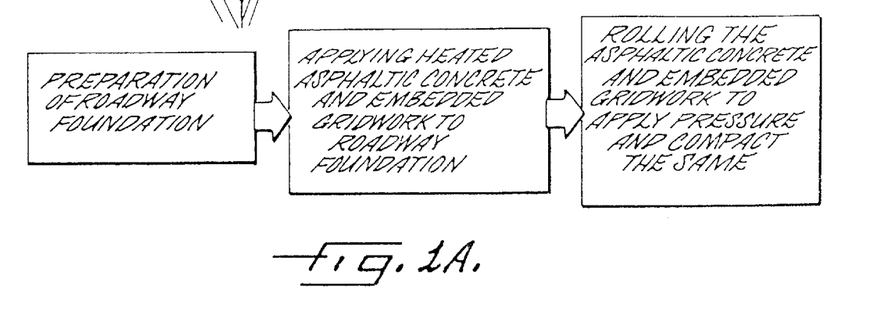

In FIG. 2, a structural reinforcement member for reinforcing a product is shown which embodies the present invention, and which comprises a gridwork 10 comprising a set of warp strands 12 and a set of weft strands 14 disposed at substantially right angles to each other. Each of the strands comprises a plurality of continuous filaments, composed for example of glass, carbon, aramid, or nylon, with glass filaments being the most preferred. An E-type glass is particularly suitable.

The set of warp strands 12 is separated into groups 13, each containing two contiguous strands in the illustrated embodiment. The set of weft strands 14 is separated into groups 15, each containing four contiguous strands in the illustrated embodiment. The groups of strands of each set are spaced apart from each other so as to define an open structure. Also, it will be noted that in the illustrated embodiment, one strand of each group of the warp strands 13 lies on one side of the set of weft strands, and the other strand of each group of the warp strands 13 lies on the other side of the weft strands. Thus, the sets of strands are non-interlaced. Also, the resulting superimposition of the warp strands achieves a "pinching or encapsulation" effect of the strands in the weft direction creating a mechanical and chemical bond at the crossover points.

The gridwork 10 is impregnated substantially throughout with a thermosettable B-stage resin so as to interlock the strands at their crossover points and maintain the gridwork in a semi-flexible state which permits the gridwork to conform to the shape of the product to be reinforced. The gridwork is designed to be incorporated into a finished product such that the material is conformed to the shape or the functionality of the end-use product and then cured to form a structural composite. The ability of the gridwork to be conformed to the shape of the product allows the member to be cured by the inherent heat that is applied or generated in the ultimate construction of the finished product. For example, in the case of laying hot asphalt in paving roads or using hot asphalt for roofing systems, the thermosettable B-stage resin impregnated into the gridwork would be cured by the heat of the hot asphalt as used in these processes. The resin would be selected for impregnation into the grid such that it would cure by subjecting it to the hot asphalt at a predetermined temperature.

The crossover of the strands can form openings of various shapes including square or rectangular which can range from ½ to 6 inches in grids such as that shown in FIG. 2. FIG. 2 shows a square opening with dimensions of ½ inches in the warp direction and ½ inches in the weft direction. The size of the glass fiber bundles in each strand can vary. A range of glass strands with a yield from 1800 yards per pound up to 56 yards per pound can be used. One preferred embodiment is having each group of warp strands 13 composed of two 247 yards per pound superimposed strands, and each group of weft strands 15 composed of four side by side or overlapping strands of 433 yards per pound.

The gridwork 10 may be constructed using a conventional machine, such as the web production machine disclosed in U.S. Pat. No. 4,242,779 to Curinier et al., the disclosure of which is expressly incorporated by reference herein.

FIG. 2 also shows the flat gridwork impregnated substantially throughout with a thermosettable B-stage resin so as to interlock the strands at their crossover points and maintain the gridwork in a semi-flexible state. A B-stage resin is a thermosetting type resin which has been thermally reactive beyond the A-stage so that the product has only partial solubility in common solvents and is not fully fusible even at 150°–180° F. Suitable resins include epoxy, phenolic, melamine, vinyl ester, cross linkable PVC, and isophthalic polyester. A common characteristic of all of these resins is that they are of the thermoset family, in that they will cross link into a rigid composite, which when fully cured cannot be resoftened and remolded. They also have the capability to be "B-staged", in which they are not filly cured and can be softened and reshaped either to conform to the shape of the end use product or corrugated into a three dimensional shape as described below. The preferred embodiment will use a urethane epoxy resin applied to the flat open mesh scrim by means of a water emulsion.

Figure 6:
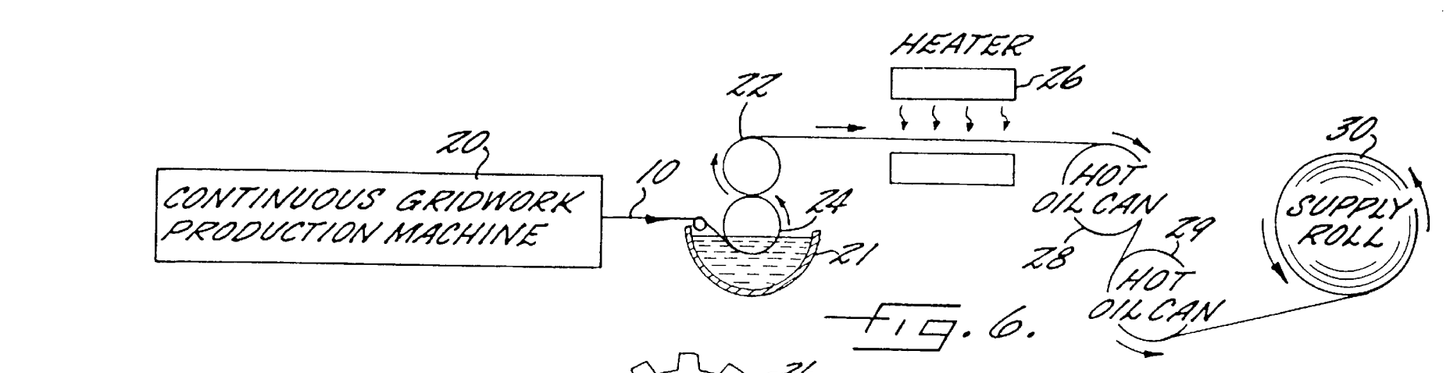
FIG. 6 is a schematic illustration of a method of producing the structural member in accordance with the present invention.
Figure 7:
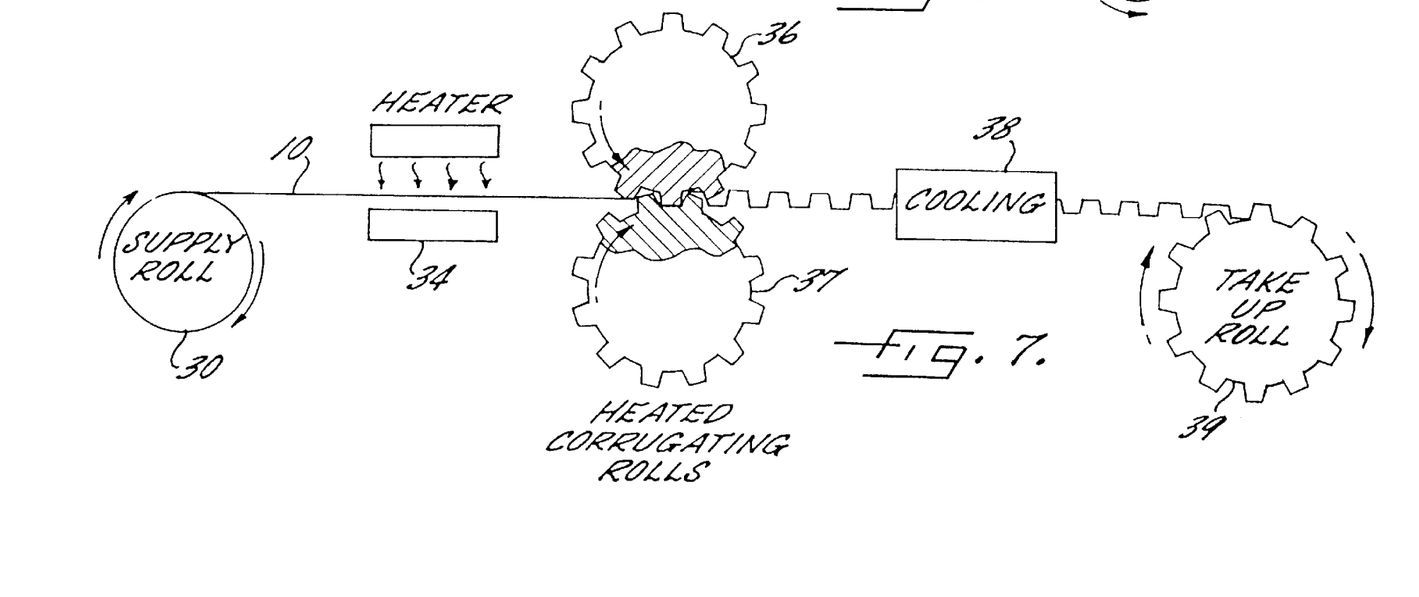
FIG. 7 is a schematic illustration of a method of producing the embodiment illustrated in FIG. 3.

A preferred method of producing the gridwork 10 includes applying the resin in a "dip" operation, as illustrated in FIG. 6. In particular, the gridwork 10 is produced on a continuous processing machine 20 as illustrated for example in the above-referenced '779 patent. From the machine 20, the gridwork 10 is advanced along a path of travel and immediately immersed in a liquid resin bath 21 which is thermosettable and capable of being heated to cure to the B-stage. Next, the resin coated advancing gridwork advances through a nip defined by a pair of squeeze rollers 22, 24, which acts to squeeze off excess resin, cause the resin to penetrate into the strands, and firmly press the crossover points of the sets of strands together. From the squeeze rollers, the advancing gridwork is heated to an extent sufficient to cause the resin to cure to the B-stage without fully thermosetting. This heating is accomplished by passing the gridwork through a radiant heater 26 or the like, and then about a pair of heated cans 28, 29, so that heat and pressure from contact with the cans are applied to both of the surfaces of the gridwork. Finally, the advancing gridwork is wound into a supply roll 30 so as to facilitate its transport to a job site, or to a further production operation as illustrated in FIG. 7 and described below.

In the above described "dip" operation, the resin in the bath 21 is water emulsified with the water being evaporated by the subsequent nipping and heating operations. Resins which are capable of being "B-staged" as described above, are suitable, and the resins contemplated for this structural member are non-solvent based resins, and may or may not be water emulsified. Resins such as polyethylene or PPS may also be utilized. These resins would be applied in an emulsion type coating operation, and cured to a B-stage.

Impregnating the gridwork 10 with a thermosettable B-stage resin permits the gridwork to be semi-flexible and conform to the shape of the product to be reinforced, particularly with the application of heat. Once the gridwork is conformed to the shape of the product to be reinforced, the B-stage resin is cured to a thermoset state, providing upon cooling added rigidity and enhanced properties to the resulting product.

One of the advantages of the gridwork 10 as disclosed in FIG. 2 is that it can be conformed to the shape of the product desired to be reinforced and cured in situ using the heat available in the normal manufacturing process, such as heated asphaltic concrete in asphaltic roadway construction. Alternatively, it may be cured by external heat, in which case it may be cured to a rigid state prior to incorporation into a finished product or supplemental heat can be applied after incorporation in the finished product, if desired.

Once cured, the gridwork is relatively rigid. This produces a structural member adapted to reinforce a product such as a pre-cast concrete part, base of asphalt overlay, etc. Such a rigid gridwork would be structurally composed of the same strand configurations and compositions as the flat gridwork impregnated with a B-stage resin, except that the B-stage resin has been advanced to a fully cured C-stage. The resulting rigid state of the gridwork provides added reinforcement to the product.

Figure 3:
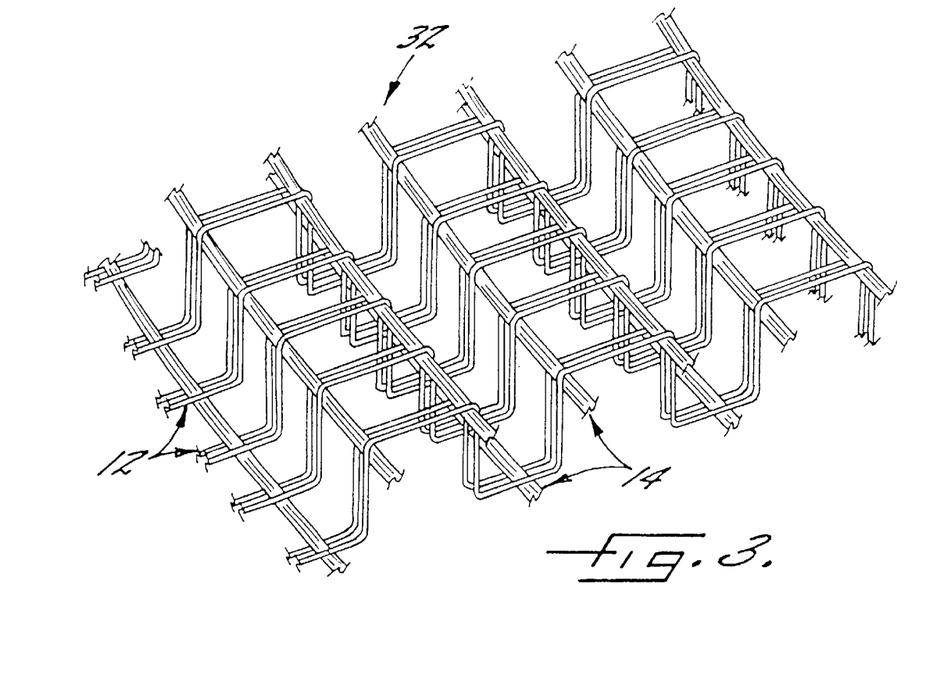
FIG. 3 is a perspective view of a structural member adapted to reinforce a product comprising another embodiment of the present invention.

Another embodiment of the structural reinforcement member comprises a three-dimensional structural member as illustrated in FIG. 3 at 32. The three-dimensional structural member 32 may be formed by starting with the flat gridwork 10 impregnated with a B-stage resin described above and processing it into a three-dimensional structure. More particularly, the set of warp strands 12 is corrugated into alternating ridges and grooves, while the set of weft strands 14 remains substantially linear. As illustrated in FIG. 7, the gridwork 10 is withdrawn from the supply roll 30 and heated by means of radiant heaters 34 or the like, which serves to soften the B-stage resin and condition the material for corrugation. The softened flat gridwork impregnated with a B-stage resin will then be processed by a corrugating machine, such as meshing corrugating rolls 36, 37 or a caterpillar pulling device of the type used in the Pultrusion industry. The corrugating machine is preferably heated to further soften the flat grid material and enable it to be formed into the three-dimensional structure, and convert the resin to a fully cured C-stage if desired. Where full curing is desired, an additional heating unit may be positioned immediately downstream of the corrugating rolls, if necessary to achieve full curing. Upon exiting the corrugating machine, the gridwork will be subjected to a cooling device 38 at a predetermined temperature.

Subsequently, the gridwork will proceed through a roll-up mechanism which will roll up the corrugated material into a take up roll 39 such that nesting will occur to produce an acceptable roll for shipment to the job site. The roll can be of a desired width or length to accommodate the specific constraints of the product to be reinforced.

The three-dimensional structural member 32 can accommodate a variety of parameters and grid configurations differing according to varying needs of different applications such as in concrete and asphalt road construction. Grid height can be varied to accommodate restrictions of end products. For example, grids for concrete will generally have a greater height than grids for asphalt paving primarily because of the need to reinforce the greater thickness of a new concrete road as compared to asphalt overlays which are usually only 2–2½ inches thick. In a new asphalt road construction, where the thickness of the overlay might be 5–11 inches, grids of greater height would be provided. Generally, asphalt is applied in asphaltic paving in a plurality of layers each being 2–5 inches thick, and as such the preferred grid for asphalt reinforcement would have a height between ½ and 4 inches. Grids of varying width can also be provided, for example, grids up to seven feet are presently contemplated, yet no restriction is intended on grids beyond this width by way of this example.

The three-dimensional structural member 32, with a thermosettable B-stage resin as described previously, permits the gridwork to be semi-flexible and conform to the shape of the product to be reinforced. Once the gridwork is conformed to the shape of the product to be reinforced, the B-stage resin would be cured providing added rigidity and enhanced properties to the resulting product. One of the advantages of the gridwork as disclosed in FIG. 3 is that it can be conformed to the shape of the product desired to be reinforced and cured in situ using either the heat available in the normal manufacturing process, such as heated asphaltic concrete in asphaltic roadway construction, or by heating from an external heat source. The structural member 32 could also be cured to a rigid state prior to incorporation into a finished product if desired. The gridwork could be cured thermally at a predetermined temperature depending on the particular resin.

The three-dimensional structural member 32 has many potential applications. A preferred embodiment is a method for fabricating a reinforced concrete or asphaltic roadway. Also, the three-dimensional gridwork can be used for reinforcing concrete structures in concrete precast slabs, for reinforcing double "T" concrete beams, concrete pipe, concrete wall panels, and for stabilization of aggregate bases such as rock aggregate used as a subbase in road construction.

Figures 4, 5:
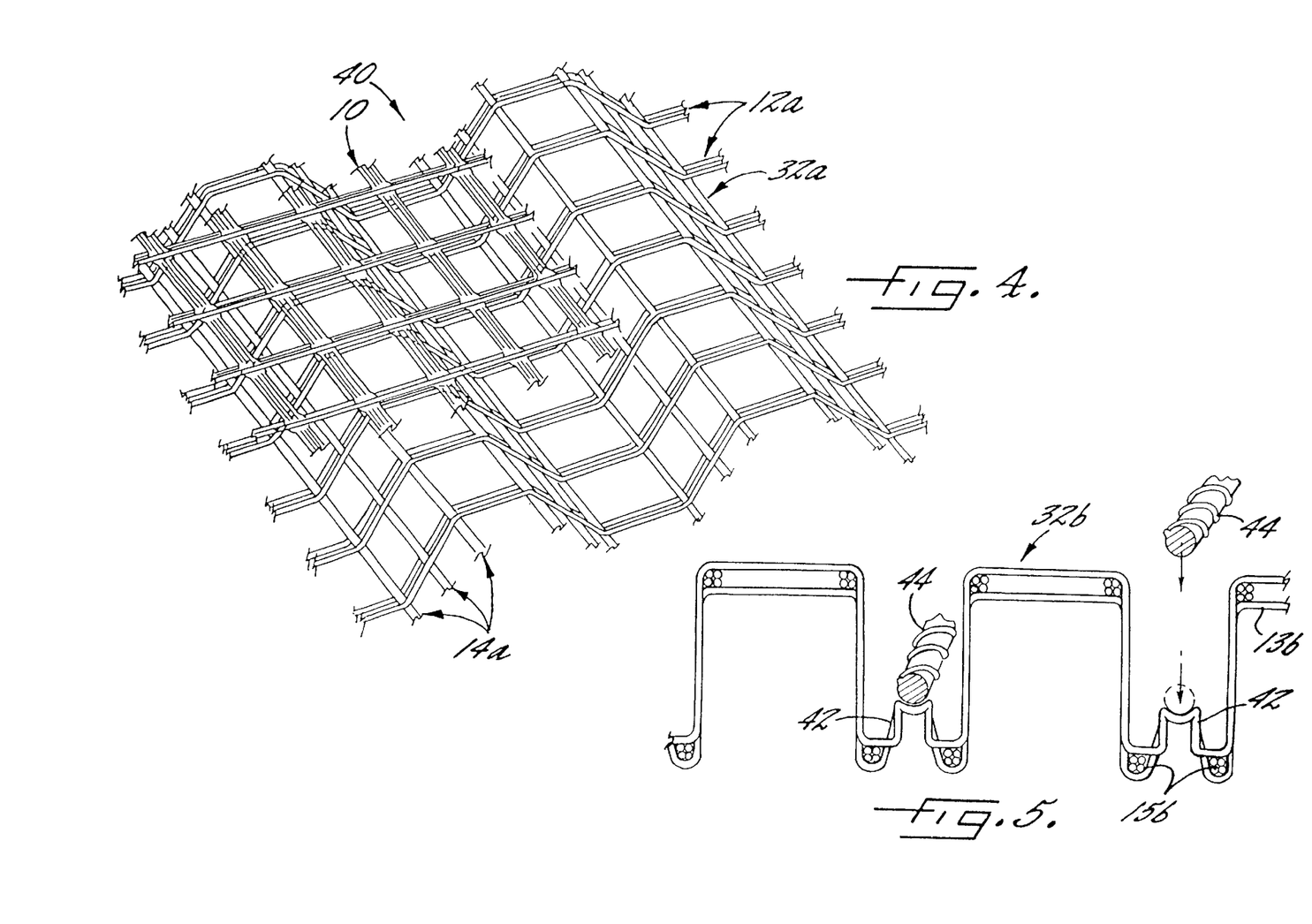
FIG. 4 is a perspective view of a structural member adapted to reinforce a product comprising another embodiment of the present invention.
FIG. 5 is a perspective view of an embodiment of a structural member of the present invention and which is adapted for use with metal or fiber glass rebars.

FIG. 4 shows another embodiment of a three-dimensional structural composite member 40 adapted to reinforce a product, and which embodies the present invention. This embodiment comprises a three-dimensional corrugated member 32a which is similar to the member 32 as described above, but wherein the corrugations of the warp strands 12a are inclined at about 45° angles, rather than substantially vertical as in the member 32. Also, the number and placement of the warp groups 14a is different. As illustrated, the member 32a is used in conjunction with a generally flat gridwork 10 as shown and described above in connection with FIG. 2. Specifically, the generally flat gridwork 10 is positioned to be coextensive with one of the planes of the three-dimensional gridwork.

The three dimensional composite member 40 can be impregnated with a B-stage resin as described above, or alternatively, it can be fully cured prior to incorporation into a product to be reinforced, such as Portland cement concrete products as further described below.

Another embodiment of the invention is illustrated in FIG. 5, and comprises a three dimensional structural reinforcement member 32b comprising gridwork of a construction very similar to that illustrated in FIG. 3, and which comprises groups of warp strands 13b and groups of weft strands 15b disposed at right angles to each other. The member 32b further includes specific positions 42 molded into the warp strands of the gridwork to allow steel or fiber glass rebars 44 to be placed in at least some of the grooves of the corrugations and so as to extend in the direction of the corrugations. In the preferred embodiment, these positions would allow the steel or fiber glass rebars 44 to be placed between the upper and lower surfaces defined by the corrugations, and thus for example approximately 1 inch from the foundation or surface upon which the corrugated grid structure was placed. After placing the steel or fiber glass rebars on these molded in positions 42, additional steel rebars (not shown) could be placed at right angles to the original steel rebars and on top of them holding them in place by tying them to the "Z-axis" fibers of the composite corrugated gridwork. The main benefit to the "molding in" of the positions 42 into the corrugated composite gridwork is to allow the steel or fiber glass rebars to be placed a distance from the foundation or base upon which the corrugated gridwork is placed. In placing steel rebars conventionally in products such as bridge decks, it is common to use small plastic chairs in order to position the steel rebars so that they are not lying on the foundation, but are positioned approximately 1–2 inch up off of the foundation. These separate chairs are not required with the embodiment of FIG. 5.

Methods for Utilizing the Structural Reinforcement Member

The several embodiments of the structural reinforcement members as described above can be utilized in a variety of methods for reinforcing various products. One method involves providing the gridwork impregnated with a B-stage resin as described, applying the gridwork to the product in conforming relation, and then applying heat to the product so as to cure the resin and convert the same into a fully cured resin to thereby rigidify the gridwork and reinforce the product. Any product where the advantage of having a semi-rigid open reinforcement which could be cured in situ would be a potential application in which this method could be used. Therefore the embodiments contained herein by way of example do not limit such methods and uses.

There exist different methods to reinforce various products with the embodiment of this invention which comprises a generally flat gridwork impregnated with B-stage resin, including methods to fabricate reinforced roadways, concrete structures, tires, and telephone poles.

Figure 1:
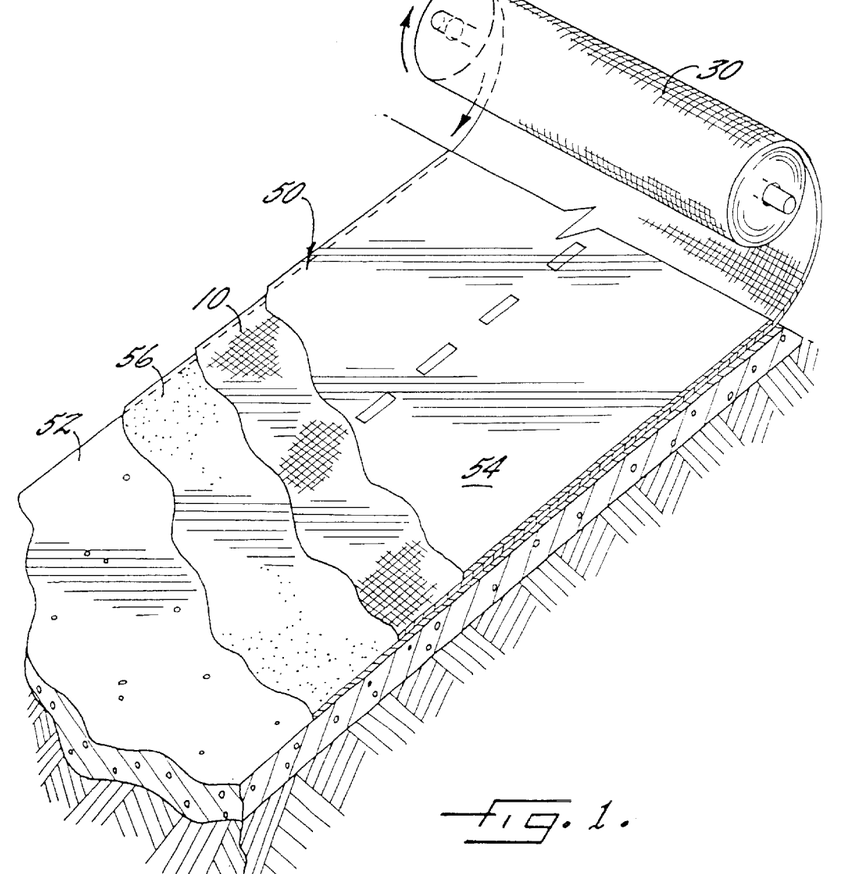

One preferred embodiment of utilizing the generally flat structural reinforcement member impregnated with a B-stage resin is a method of fabricating a reinforced asphalt road overlay to stop or retard reflective cracking. FIG. 1 shows an embodiment of this method. Other embodiments of the invention comprise methods utilizing the three-dimensional composite structure impregnated with a B-stage resin or in the combination of the flat grid and the three-dimensional grid laid coextensively with the three-dimensional grid structural member. Further, the three-dimensional gridwork structure can be provided, in different embodiments, with a corrugated configuration which defines two parallel planes which are spaced apart a distance of between about ½ and 6 inches as shown in FIG. 3. Another embodiment comprises a method utilizing the three-dimensional structural reinforcement member in a rigid state impregnated with a cured thermoset resin. Any of these open mesh gridwork configurations can be utilized in methods for fabricating reinforced roadways by resurfacing old concrete or old asphalt roads or constructing new asphalt roads.

FIG. 1 shows a method of fabricating a reinforced roadway 50 composed of an asphaltic concrete material. Asphaltic concrete as used herein refers to road construction materials including an asphalt matrix material with aggregate (rock, etc.).

The method of fabricating a reinforced roadway 50 composed of an asphaltic concrete material comprises a first step of preparing a foundation 52 for the roadway. A second step comprises providing an open mesh gridwork of one of the above described constructions, such as the gridwork 10, and which includes a thermosettable B-stage resin so as to interlock the strands at their crossover points and maintain the gridwork in a semi-flexible state. The third step comprises positioning the gridwork 10 on the foundation 52 for the roadway, and the fourth step comprises applying heated asphaltic concrete 54 upon the foundation 52 so as to cover the gridwork, and such that the heat of the asphaltic concrete acts to soften the gridwork so that it can conform to the foundation, and cure the resin and convert the same into a fully cured resin to thereby rigidify the gridwork and reinforce the underside of the asphaltic concrete overlay.

For the generally flat structural reinforcement member, the step of preparing the foundation of the roadway would preferably involve applying an asphalt tack coat 56 to provide holding for the generally flat grid. The step of providing the open mesh gridwork could be accomplished by preferably unrolling the open mesh gridwork from supply rolls 30 upon which the gridwork would be brought to the roadway. These supply rolls could be used with both the generally flat or three-dimensional structure. Various continuous lengths of the open mesh gridwork impregnated with a B-stage resin could be contained on the rolls in the circumferential direction around the rolls. The small diameter carbon or fiberglass strands are flexible enough to be applied around these rolls without cracking.

The gridwork could be unrolled onto the prepared roadway to a desired length and cut. The gridwork could also be cut to a desired specialty shape and positioned on the road surface. The advantage of the semi-rigid gridwork impregnated with a B-stage resin is that is can be provided on rolls with varying lengths. The semi-rigid state allows the gridwork to roll without cracking or failing. Also, the semi-rigid gridwork resists wrinkling once placed on the foundation, allowing persons or machines to move across it. The gridwork can be easily cut using industrial scissors.

For the step of applying asphaltic concrete heated to a predetermined temperature, conventional methods of applying asphalt can be used. In fact, an advantage of the present invention is that in both the flat grid and three-dimensional structure, conventional paving methods can be used. The asphalt paver would normally apply 2 to 2½ inches thick asphalt overlay. Following this paver, a compactor would normally compress the asphalt to the desired thickness.

The heat of the asphalt, which is approximately 200° to 300° F., combined with the weight of the asphalt will cause the B-stage resin in the gridwork to cure forming a cured composite on the bottom of the asphalt overly. There is also a mechanical bond of the cured grid composite to the base of the asphalt and a degree of a chemical bond between the B-stage thermosetting resin and the asphalt matrix material. The asphalt remains above 200° F. for at least an hour after initial application of the asphalt. B-stage resins which cure in this time and temperature range are preferred for this embodiment.

The method of fabricating a reinforced roadway composed of asphaltic concrete material may further comprise the step of applying pressure upon the asphaltic concrete immediately after the applying step so as to compact the same and generate additional heat.

The flat open mesh grid is un-rolled in the direction of travel of the machinery, such that as a continuous sheet, the grid will be less likely to move during the process of laying the asphaltic road material. The three-dimensional gridwork structure is designed to deform sufficiently under the top layer of the packed asphalt under the weight of the paving roller and not spring back up above the top of the paving after being deformed in the direction of the vertical Z-axis or produce internal delamination in a horizontal plane. The three-dimensional structure has the added advantage over prior products as an open mesh product allowing the asphaltic materials to pass through the grid and provide three-dimensional reinforcement to the new road overlay. The heat of the asphalt plus the weight of the asphalt cause the B-stage resin to cure. The three-dimensional gridwork can also be applied in a fully cured (C-stage) condition.

Once the flat grid with the thermoset resin is cured in situ to a rigid state, the cured grid structure stabilizes and reinforces the immediate laminate area between the bottom of the asphalt overlay and the old concrete road, or old asphalt road or in the case of the new asphalt road would stabilize the interface between the asphalt and the prepared earth. If the cured gridwork is positioned between the top and bottom of the asphalt overlay, it would stabilize the interface of these two separately applied layers of asphalt. The cured grid would stabilize the immediate surface of the bottom of the asphalt overlay or new asphalt road, and it would increase the flexural, tensile and compression strength of this layer. The strands are disposed at substantially 90° angles such that the base of the asphalt overlay would be stabilized, diminishing or eliminating the tendency for reflective cracking to propagate up from a cracked old concrete or asphalt road would be drastically diminished or eliminated.

The use of the flat grid and three-dimensional grid in conjunction, as shown in FIG. 4, would serve to unitize the three-dimensional composite grid in the direction of corrugation and to allow workers in the field to be able to better walk on the material as the concrete is being pumped through the grid structure to form the finished concrete road. The flat grid can be laid on top of the three-dimensional grid, and fastened with fastening means such as metal or plastic twist ties in order to better hold the flat grid structure to the top of the corrugated grid structure. Also, in concrete road construction a flat composite grid could be positioned beneath the three-dimensional corrugated grid structure to give added structural integrity to the three-dimensional structure.

The three-dimensional gridwork is versatile in allowing the contractor to tailor the amount of desired reinforcement in the concrete road by nesting the corrugated three-dimensional structures one on top of the other. This would still allow concrete flow through the openings in the grid structure, but would provide a means to increase the amount of reinforcement in the concrete.

The three-dimensional corrugated grid structure will help prevent cracks from developing in the asphalt by reinforcing the asphalt roadbed in three directions and will keep the roadbed surface flatter for a longer period of time by increasing the compression load carrying capabilities of the asphalt road. The vertical composite strands add to the compression strength. The three-dimensional corrugated grid structure in asphalt road construction would allow "controlled" movement of the asphalt road in the direction of traffic flow, but would provide continuous rigid reinforcement in the transverse direction to traffic flow which would stabilize the tendency of asphalt toads to expand in the transverse direction as a result of the continued downward loads on the "flexible pavement material". The preferred embodiment in asphalt overlay of 2 to 2½ inches of thickness is with a three-dimensional corrugated grid structure that is approximately 1 to ½ inches in height.

The three-dimensional corrugated material could be supplied to the asphalt contractor on rolls. The corrugations would be transverse to the longitudinal dimension of the roll, and this would allow nesting of the form as the product is rolled. The unrolling of the product onto the roadbed surface would also place the corrugations transverse to the direction of vehicular flow. In order to apply this rolled three-dimensional composite grid into an asphalt road, modification is made to a standard asphalt paver such that a device for mounting a roll is positioned roughly in the center to the back of the asphalt paver. The corrugated material processes vertically behind the auger and in front of the compactor screed on a standard asphalt paver, so that it is applied upon the roadway foundation concurrently with the asphalt concrete. There is approximately a 3 inch opening which would be sufficient to feed this roll of three-dimensional corrugated material. The material would come in contact almost immediately with the hot fluid asphalt mixture and lay down on the roadway being resurfaced or on the prepared surface in the case of new road construction. Due to the way in which the grid structure would feed, the bottom of the grid structure would be in close proximity to the road surface and not up in the asphalt overlay. This method also has the advantage of laying down the gridwork behind the wheels of the paving machine, which permits a gridwork having the full width of the paver to be laid down.

The three-dimensional structural member has numerous advantages. Once positioned into the asphalt overlay the asphalt road would be reinforced to a greater degree than by prior art products. Also, the asphalt road would be stabilized in the transverse direction because only straight (non-corrugated) fibers will be positioned in this direction and this plus the interlocking grid structure will reduce or eliminate the tendency of the asphalt road to expand in the transverse direction. Further, the composite strands in the "Z" direction will act like springs. After being incorporated into the asphalt overlay, a very heavy roller compacts the asphalt. Typically a 3 inch thick asphalt overlay will compact to 2½ inches. The "Z" axis reinforcements are flexible enough in order to bend into the shape of an arc as the compactor moves over the asphalt overlay. They are flexible enough to remain in a bent condition and the cohesiveness of the asphalt mixture is great enough so that the bent fibers do not cause the asphalt overlay to separate or shear horizontally under the upward pressure of the "Z" axis fibers. Once the asphalt has cooled, the composite grid is uniformly dispersed throughout the asphalt overlay in which the "Z" axis fibers of the composite grid are in a bent condition and they will respond much like a spring as the road sees vehicular traffic from the standpoint of providing additional compressive load carrying capabilities.

In addition to the above explained reinforcement of the asphalt road in the "Z" axis direction, the "Z" axis fibers will also move slightly forward and back in the direction of vehicular traffic movement. This is a benefit to maintaining a smooth road surface where sudden vehicular stopping is encountered such as at a traffic light. Because the corrugations are oriented to move forward and back in the direction of vehicular traffic movement, and there are flexible composite "Z" axis oriented fibers, they will act as reinforcing springs to control the tendency of the asphalt road to move forward as a vehicle stops at a traffic light. They will move as the asphalt wants to move, but as they move, they will generate a force in the opposite direction which will serve as a stabilizing force for the asphalt road to keep it smooth so that it will not be moved forward permanently and produce a wrinkled, bumpy surface.

Composites especially fiberglass fibers reinforced with epoxy resins, have an established historical track record of performing excellently in a fatigue environment. In the case of the composites that are "bent" in the "Z" axis, the continued very minor deflection that is seen as vehicles move over the road surface would not cause failure long term in the composite "Z" axis structure.

The embodiments of the novel gridwork as described herein have a variety of uses, in addition to reinforcing roadway surfaces. For example, decayed telephone poles can be rehabilitated, with the heat mechanism for cure being a hot asphalt matrix or possibly additional external heat for full cure. Another embodiment of the invention comprises a method for fabricating reinforced concrete columns with better performance in seismic regions with the heat cure provided by an external heater or by a hot asphalt matrix overcoat.

Another embodiment of the invention comprises a method for fabricating a reinforced tire comprising calendaring an open mesh grid with a B-stage resin into a sheet of rubber, cutting the product and placing it in a tiremold. During vulcanization of the rubber, the composite would be cured into a structural composite laminate and be in the shape of the finished product. A tire incorporated with this flat grid structure would produce a structurally reinforced rubber tire. The fiber orientation of the grid would be such that the fibers would be oriented transverse to the direction of the tire movement and also longitudinal to the direction of the tire movement. In a transverse direction, the improved product would act like existing steelbelt radials and in the longitudinal direction would have a tendency to keep the tire more round. The reinforcements could be selected to make a stronger or more flexible structure reinforcement which could influence the ride that is experienced by the driver using tires made in this fashion.

The gridwork of the present invention, when fully cured as described above, is particularly useful in reinforcing a structure composed of a concrete material, such as Portland cement concrete. For example, in the case of new roadway construction, the foundation is prepared and the fully cured gridwork is placed upon the foundation. Thereafter, the liquid concrete is poured upon the foundation so as to immerse the gridwork, and upon the curing of the concrete, a reinforced concrete roadway is produced with the gridwork embedded therein.

Another use for the present invention involves a method of reinforcing asphaltic roofing, either as a prefabricated single-ply sheeting or as a conventional built-up roofing. During formation of the roofing, the heat of the hot asphalt will cure the B-staged resin to the C-stage. The result is a stronger roofing that will resist sagging or deformation and rupture by walking or rolling traffic on the roofing.

The present invention is more fully explained in the following non-limiting specific examples.

Resin Composition and Mixing Procedure

Weigh into an open topped 55 gallon drum 150 pounds of Epi Rez 3519-W-50 (Shell Chemical). Add 150 pounds of Epi Rez 5520-W-60 to the same drum with the Epi Rez 3519. Mix these two materials until uniformly blended. In a separate container weigh 4494 grams of 2 Methyl Imidazole (2MI) and add 8989 grams of water. The water may be hot or cold. Heat this 2MI and water until a clear solution is formed. The temperature should be between 75° C. and 85° C. (If heating is slow, additional water may be added to replace evaporation losses.) Add the clear hot 2MI solution to the rapidly stirred drum slowly over several minutes. The speed of addition should be adjusted to allow the 2MI to mix with the larger volume of water while remaining in solution.

The material is now ready to use. The viscosity can be adjusted by the addition of water. Reduction of the viscosity to 2650 cps required the addition of 6000 grams of water. Under normal conditions, this solution will be stable for about 3 days. The viscosity can be adjusted higher or lower to accommodate various machinery set ups to accomplish the desired coating of the roving.

First Specific Example of Gridwork

A gridwork may be fabricated in accordance with the method illustrated in FIG. 6, with the gridwork comprising
   a) warp strands each composed of PPG 1715 roving composed of approximately 5,600 glass filaments, and each having a yield of about 247 yards/lb; and
   b) weft strands each composed of PPG 1715 roving composed of approximately 3,200 glass filaments, and each having a yield of about 433 yards/lb.

The warp strands may be separated into groups each containing two contiguous strands, with one of the strands lying on one side of the weft strands and the other strand lying on the other side of the weft strands. The weft strands may be separated into groups each containing four contiguous strands. The groups of strands may be separated so as to define openings of 1-inch square.

The gridwork may be advanced so as to be immersed in a liquid resin bath formulated in accordance with the above specific example, and then passed through nip rollers to remove the excess resin and force the resin into the strands. The advancing gridwork may then be passed through a radiant heater, which serves to raise the temperature of the gridwork to about 150° F. and initiate the curing of the resin. The gridwork may then be advanced over a pair of heated cans so that opposite sides of the gridwork directly contact respective cans. The cans should be heated to a surface temperature of about 428° F. The resin will thereby be heated to an extent sufficient to cause the resin to cure to the B-stage without fully curing, and so as to interlock the strands at their cross over points and maintain the gridwork in a semi-flexible state. The resulting product may then be wound into a supply roll.

Second Specific Example of Gridwork

A gridwork may be fabricated and wound into a supply roll as described in the above example. The gridwork may then be withdrawn from the supply roll and advanced through a radiant heater so as to heat the gridwork to a temperature of about 150° F. and thereby soften the resin. Next, the advancing gridwork may be advanced through corrugating rolls which are heated to a temperature of about 250° F., and which serve to impart corrugations of about 1 inch depth and 1 inch length to the warp strands. The gridwork is then cooled, without having the resin change from its initial B-stage, and the gridwork may then be wound onto a take-up roll.

Third Specific Example of Gridwork

The gridwork of this example comprises a high warp unidirectional B-staged non-woven grid using graphite fibers in the unidirectional direction, and is believed to be particularly adapted for reinforcing the underside of damaged concrete structures such as bridge decks. In this product the unidirectional graphite fibers should be in close proximity to each other (touching each other but not overlapping) with a minimal amount of cross-directional fiber. The amount of cross-directional fiber should be sufficient to promote a degree of crossover fiber bonding so that the non-woven high unidirectional fabric can be handled.

The resin may be a B-staged thermoset resin similar to the B-staged thermoset resins used in other examples. Graphite fibers are preferred for this application because in reinforcing damaged concrete structures such as bridge decks, graphite fibers have a much higher tensile modulus and will take loads quicker and provide a much more efficient and effective fiber for reinforcing these deteriorated concrete applications.

The method of applying this gridwork includes cleaning the area of concrete to which the gridwork is to be applied. After the surface of the concrete is cleaned, a layer of epoxy resin or epoxy glue may be applied, followed by the positioning of the high unidirectional graphite fiber with the unidirectional graphite fibers in the direction where they would take the anticipated tensile loads. Additional thermoset epoxy resin or epoxy adhesive could be applied over the top of the unidirectional graphite non-woven gridwork in order to create a better laminate. The thermoset epoxy resin or epoxy adhesive generate a degree of heat in the natural room temperature curing process, and external heating devices such as heaters also could be used to apply supplementary heat to assist the thermoset resin or epoxy resin in its curing as well as to promote a full cure of the unidirectional graphite nonwoven gridwork.

Fourth Specific Example of Gridwork Utility

The gridwork contemplated for this example comprises an open mesh grid structure which may be impregnated with a B-staged thermoset resin, and which may be used for reinforcing "built up roofing structures". Broadly speaking, after the non-woven grid has been positioned with the other materials used in the roofing structure, hot asphalt which is normally used in built up roofing structures to provide waterproofing and consolidation of materials, may be applied so that the heat of the asphalt will promote the curing of the B-state thermoset resin in the open mesh grid to produce the fully cured composite in situ with the built up roofing system.

A wide latitude exists in selecting where the gridwork will be placed. Some possible examples are as follows:
  a) The gridwork could be incorporated as a separate layer in the built up roofing system, or
  b) The gridwork could be combined in a secondary manufacturing operation with the high density fiber glass insulation board on one or both sides of the gridwork such that when applied in contact with the hot asphalt, curing would be promoted to provide a structural composite, load bearing layer as part of the built up roofing system.

In this example there are many weights and grid opening patterns that could be selected for built up roofing systems, but the principle of using a non-woven gridwork that would cure in contact with the hot asphalt is a preferred feature which is common to all proposed embodiments.

In a built up roofing system, the cured gridwork system would provide stability to the built up roofing system in both compression and tension. As the system would want to expand under the heat of the sun, the cured gridwork would provide tensile reinforcement to control expansion. At night time or in the winter when the built up roofing system would want to contract, the cured composite gridwork would provide sufficient compression strength in order to stabilize the built up roofing system, and minimize contraction. The overall effect of minimizing contraction and expansion would be to significantly lengthen the life of the built up roofing system by preventing cracking in the asphaltic material which is a direct result of excess expansion and contraction.

In the drawings and the specification, there has been set forth preferred embodiments of the invention and, although specific terms are employed, the terms are used in a generic and descriptive sense only and not for the purpose of limitation, the scope of the invention being set forth in the following claims.

What is claimed is:

1. A method of producing a structural member adapted to reinforce a product and comprising the steps of
  fabricating a gridwork which comprises a set of warp strands and a set of weft strands which are disposed at right angles to each other, with each of the strands comprising at least one continuous filament, wherein the sets of strands are non-interlaced and at least some of the strands of each set are spaced apart so as to define an open structure, and wherein the set of warp strands is separated into groups each containing a plurality of contiguous strands, with at least one strand of each group lying on one side of the set of weft stands, and at least one other strand of each group lying on the other side of the set of weft strands in contiguous superimposed relationship with said at least one strand, and advancing the gridwork along a path of travel while
(1) immersing the advancing gridwork in a liquid resin bath which is thermosettable and capable of being heated to cure to the B-stage,
(2) guiding the resin coated advancing gridwork through a nip so as to squeeze off excess resin, and cause the resin to more fully penetrate into the strands, and then
(3) heating and applying pressure to the advancing gridwork to an extent sufficient to cause the resin to cure to the B-stage without fully curing and firmly pressing the crossover points of the sets of strands together so that the crossover points bond to each other, then applying one or more layers of said gridwork to a product to be reinforced, and then heating the one or more layers of said gridwork to fully cure the resin, and the further step conducted prior to the step of applying one or more layers of said gridwork to a product to be reinforced, of corrugating at least one of said one or more layers to form alternating ridges and grooves in the set of warp threads while maintaining the set of weft strands substantially linear.

2. A method as defined in claim 1 wherein the heating step includes utilizing heat from the product to be reinforced or from an external source.

3. A method as defined in claim 1 wherein the step of applying one or more layers of said gridwork to a product to be reinforced comprises forming a composite structure composed of at least said one corrugated layer and an overlying non-corrugated layer, and applying the composite structure to the product.

4. A method of producing a structural member adapted to reinforce a product and comprising the steps of fabricating a gridwork which comprises a set of warp strands and a set of weft strands which are disposed at right angles to each other, with each of the strands comprising at least one continuous filament, wherein the sets of strands are non-interlaced and at least some of the strands of each set are spaced apart so as to define an open structure, and wherein the set of warp strands is separated into groups each containing a plurality of contiguous strands, with at least one strand of each group lying on one side of the set of weft stands, and at least one other strand of each group lying on the other side of the set of weft strands in contiguous superimposed relationship with said at least one strand, and advancing the gridwork along a path of travel while
(1) immersing the advancing gridwork in a liquid resin bath which is thermosettable and capable of being heated to cure to the B-stage,
(2) guiding the resin coated advancing gridwork through a nip so as to squeeze off excess resin, and cause the resin to more fully penetrate into the strands, and then
(3) heating and applying pressure to the advancing gridwork to an extent sufficient to cause the resin to cure to the B-stage without fully curing and firmly pressing the crossover points of the sets of strands together so that the crossover points bond to each other, then applying one or more layers of said gridwork to a product to be reinforced, and then heating the one or more layers of said gridwork to fully cure the resin, and comprising the further step of forming the gridwork into a transportable supply package after said steps (1), (2), and (3) and prior to the step of applying one or more layers of said gridwork to a product, and comprising the further steps conducted prior to the step of applying one or more layers of said gridwork to a product, of withdrawing the gridwork from the supply package and heating the withdrawn gridwork so as to soften the B-stage resin, and corrugating the heated gridwork so as to form alternating ridges and grooves in the set of warp strands, while maintaining the set of weft strands substantially linear, and cooling the gridwork so as to substantially rigidize the gridwork.

5. A method as defined in claim 4 wherein each of the strands comprises a plurality of continuous filaments selected from the group consisting of glass, carbon, and aramid.

6. A method as defined in claim 4 wherein the corrugating step includes pressing the gridwork from opposite sides with opposed corrugating forming members, and wherein the step of heating the withdrawn gridwork includes heating the corrugating forming members.

7. A method as defined in claim 4 wherein the step of applying one or more layers of said gridwork to a product to be reinforced comprises forming a composite structure composed of at least said one corrugated layer and an overlying non-corrugated layer, and applying the composite structure to the product.

* * * * *